United States Patent
Trussart

(10) Patent No.: US 11,588,868 B2
(45) Date of Patent: Feb. 21, 2023

(54) SYSTEM AND METHOD OF STREAMING CONTENT BETWEEN PEER DEVICES IN A BROADCAST ENVIRONMENT

(71) Applicant: Grass Valley Canada, Montreal (CA)

(72) Inventor: Vincent Trussart, Montreal (CA)

(73) Assignee: Grass Valley Canada, Montreal (CA)

( * ) Notice: Subject to any disclaimer, the term of this patent is extended or adjusted under 35 U.S.C. 154(b) by 0 days.

(21) Appl. No.: 17/653,037

(22) Filed: Mar. 1, 2022

(65) Prior Publication Data
US 2022/0286489 A1 Sep. 8, 2022

Related U.S. Application Data

(60) Provisional application No. 63/155,655, filed on Mar. 2, 2021.

(51) Int. Cl.
| | |
|---|---|
| *H04L 65/65* | (2022.01) |
| *H04L 65/61* | (2022.01) |
| *H04L 45/586* | (2022.01) |
| *H04L 12/18* | (2006.01) |
| *H04N 21/61* | (2011.01) |
| *H04N 21/63* | (2011.01) |
| *H04N 21/6437* | (2011.01) |

(52) U.S. Cl.
CPC .............. *H04L 65/61* (2022.05); *H04L 12/18* (2013.01); *H04L 45/586* (2013.01); *H04L 65/65* (2022.05); *H04N 21/6125* (2013.01); *H04N 21/632* (2013.01); *H04N 21/6437* (2013.01)

(58) Field of Classification Search
None
See application file for complete search history.

(56) References Cited

U.S. PATENT DOCUMENTS

| | | | | |
|---|---|---|---|---|
| 8,767,944 | B1* | 7/2014 | Davis | H04L 65/65 |
| | | | | 379/265.09 |
| 9,531,503 | B2* | 12/2016 | Katz | H04L 65/762 |
| 11,172,144 | B2* | 11/2021 | Savoie | G06T 5/40 |
| 11,316,912 | B2* | 4/2022 | Lapointe | H04L 65/75 |
| 2007/0268883 | A1* | 11/2007 | Quelle | H04N 21/64315 |
| | | | | 370/349 |
| 2013/0097309 | A1* | 4/2013 | Ma | H04L 67/02 |
| | | | | 709/224 |

(Continued)

*Primary Examiner* — Dhairya A Patel
(74) *Attorney, Agent, or Firm* — ArentFox Schiff LLP

(57) ABSTRACT

A system is provided for streaming broadcast media content between peer devices in a media distribution network. The system includes a virtual router panel that includes a notification service controller that receives a data communication request from two or more peer devices and a data communication handshaking controller selects a delivery protocol between the two devices based on exchanging communication candidates that identify peer addresses. A media streaming tunnel generator establishes a streaming tunnel between the first device and the second device based on the respective delivery protocol selected by the data communication handshaking controller; and an encoder packetizes video, audio and ancillary grains directly as packets of the broadcast media content to be streamed directly from the first device to the second device via the established streaming tunnel without multiplexing.

23 Claims, 9 Drawing Sheets

(56) References Cited

U.S. PATENT DOCUMENTS

2015/0341528 A1* 11/2015 Ren .......................... H04N 5/04
  348/515
2016/0301964 A1* 10/2016 Laliberte ............ G06Q 30/0207
2022/0014575 A1* 1/2022 Corl ........................ H04L 45/64

* cited by examiner

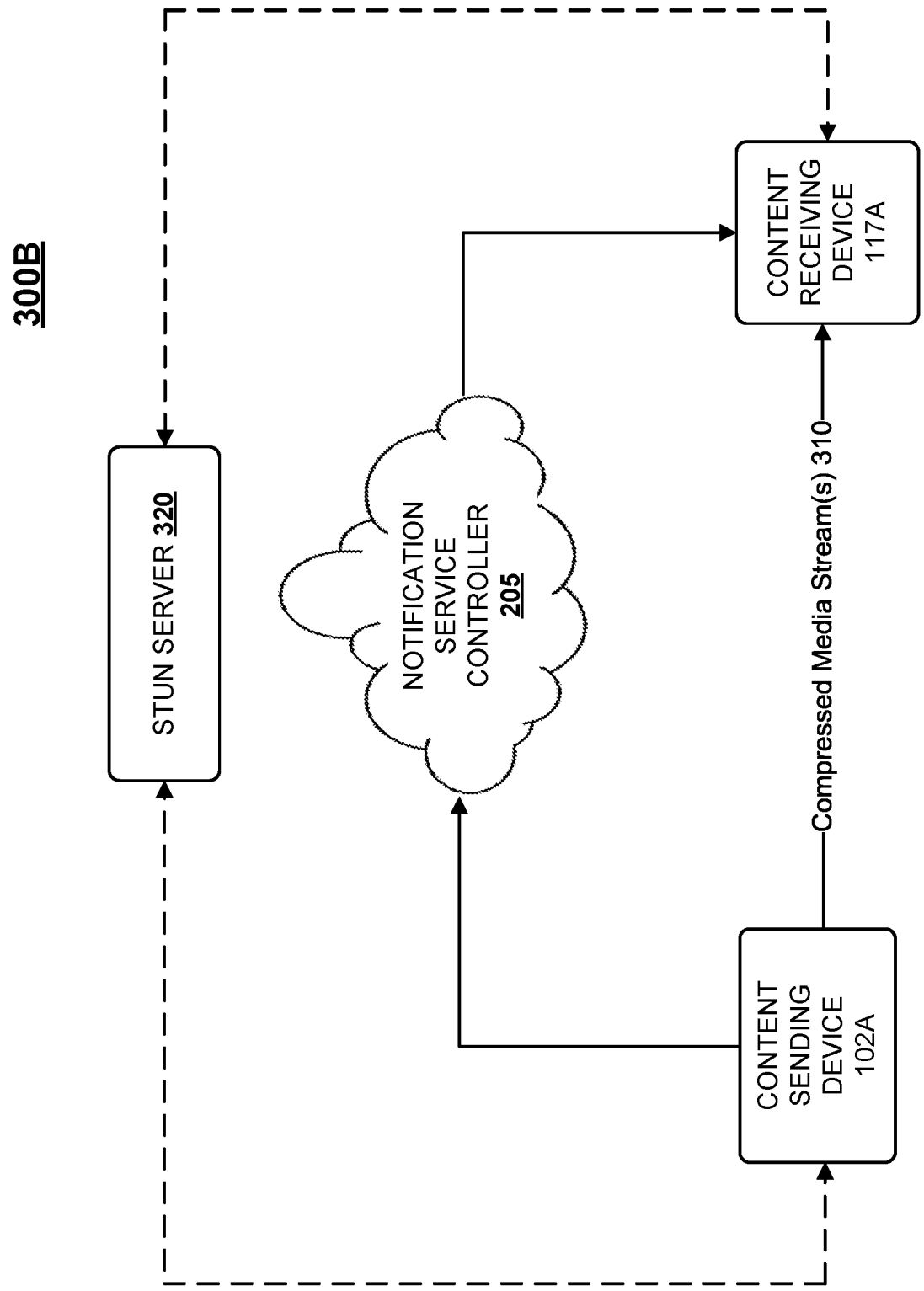

SYSTEM AND METHOD OF STREAMING CONTENT BETWEEN PEER DEVICES IN A BROADCAST ENVIRONMENT

CROSS REFERENCE TO RELATED APPLICATIONS

This application claims priority to U.S. Patent Provisional Application No. 63/155,655, mailed Mar. 2, 2021, the entire contents of which are hereby incorporated by reference.

TECHNICAL FIELD

The present invention relates to media production, and, more particularly, to a system and method for streaming content between peer devices in a broadcast environment.

BACKGROUND

In broadcast media production, most low latency media streaming protocols make use of UDP (user datagram protocol) that enables applications to send message (e.g., datagrams) to other hosts on an Internet Protocol (IP) network. UDP provides many advantages over TCP (transmission control protocol) making it suitable for media streaming. However, one significant shortcoming is that UDP does not guarantee an ordered delivery of packets, which can be lost, reordered, duplicated and the like. Lost packets will occur and shall be expected, even when streaming inside a LAN (local area network), a dedicated WAN (wide area network) or within a data center. Accordingly, resiliency has to be implemented at the application, typically using either preventive protection or reactive correction.

Preventive protection is provided by sending additional data (i.e., FEC—forward error correction) allowing a receiver to reconstruct missing packets. This amount of FEC data is usually configurable, but the protection comes at the expense of bandwidth overhead due to the additional data transmitted with the media content. In contrast, reactive correction, also referred to as ARQ or automatic repeat request, is an error-control method for data transmission that uses acknowledgements sent by the sender to confirm the packet has been received correctly. Using ARQ, the receiver detects lost packets and requests a packet to be resent by the sender upon detecting a lost packet. In contrast, to preventive protection, this scheme does not require additional bandwidth, but adds a fixed amount of latency required for the packet loss to be detected, retransmission requests to be sent and then the replacement packet to be received from the sender.

In addition, in a media production and broadcast environment, timing information must be provided with the media streams to enable the receiver to decode and present the media grains (e.g., video, audio and ancillary data) in a synchronized manner, without introducing lip sync artifacts, i.e., errors or mismatch. Current UDP streaming protocols rely on multiplexing of encoded media grains in an MPEG transport stream that carries its own clock (i.e., PCR—program clock reference) and each packetized elementary stream packet carries a presentation timestamp (PTS) related to the PCR. However, these complex transport stream multiplexing phases further increase latency when sending media content between a sender and receiver.

Moreover, streaming the media content over Internet protocols relies on exposing IP addresses and PORTs to traverse firewalls at the receiver in order to establish connections.

However, exposing ports is a complex and risk prone process that typically involves multiple business departments (e.g., IT department at a company), and, therefore, further increases the latency of the media streaming.

Accordingly, a system and method is needed for performing Internet-wide peer to peer media broadcast streaming at low latency and without the need to perform prior configuration of firewalls.

SUMMARY OF THE INVENTION

A system and method is disclosed herein for streaming content between peer devices in a broadcast environment. In an aspect, a system is provided for streaming broadcast media content between a plurality of peer devices in a media distribution network. In this aspect, the system includes a virtual router panel that includes notification service controller configured to receive a data communication request from at least two devices of the plurality of peer devices, wherein the data communication request from a first device of the at least two devices includes a publication request to provide the media content, and wherein the data communication request from a second device of the at least two devices includes a subscription request to receive the media content; and a data communication handshaking controller configured to select a delivery protocol between the at least two devices based on exchanging communication candidates that identify peer addresses configurable for performing media streaming of the media content from the first device to the second device. Moreover, the data communication handshaking controller selects a first delivery protocol when the communication candidates identifies local IP addresses of the first and second devices, selects a second delivery protocol that identifies a STUN server if at least one of the communication candidates is an externally visible IP address, and selects a third delivery protocol that utilizes a relay server for streaming the media content having a publicly visible address. The system further includes a media streaming tunnel generator configured to establish a streaming tunnel between the first device and the second device based on the respective delivery protocol selected by the data communication handshaking controller; and an encoder configured to packetize video, audio and ancillary grains directly as a plurality of packets of the broadcast media content configured to be streamed directly from the first device to the second device via the established streaming tunnel without multiplexing.

According to an exemplary aspect, the established streaming tunnel is configured to bypass a firewall on the second device to deliver the plurality of packets of the broadcast media content thereon, and the plurality of packets include real-time transport protocol (RTP) timestamps that are unpacked by the second device to align and synchronize the media content during playout thereon.

According to another exemplary aspect, the media streaming tunnel generator establishes the streaming tunnel for Internet streaming of the broadcast media content from the first device to the second device without prior configuration of the firewall on the second device.

According to another exemplary aspect, the established streaming tunnel streams the broadcast media content from the first device to the second device without exposing an IP address and a port of the second device.

According to another exemplary aspect, the at least two devices of the plurality of peer devices communicate the respective data communication requests based on respective web browsers using Web real-time communication protocols to communicate the requests to the virtual router panel.

According to another exemplary aspect, the notification service controller is configured to store a list of the plurality of peer devices that includes metadata indicating a respective type and format of the streaming tunnel that streams the broadcast media content from the first device to the second device, such that a subsequent subscription request from another of the plurality of peer devices can access the broadcast media content over a streaming tunnel based on the stored type and format available by the first device.

According to another exemplary aspect, the encoder packetize the video, audio and ancillary grains based on raw codecs over RTP, such that the first device streams the broadcast media content over the streaming channel to the second device without the multiplexing to synchronize timing of the video, audio and ancillary grains.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

FIGS. 3A-3C illustrate processes for establishing connections between peer devices in a broadcast environment according to an exemplary embodiment.

DETAILED DESCRIPTION

Figure 1:
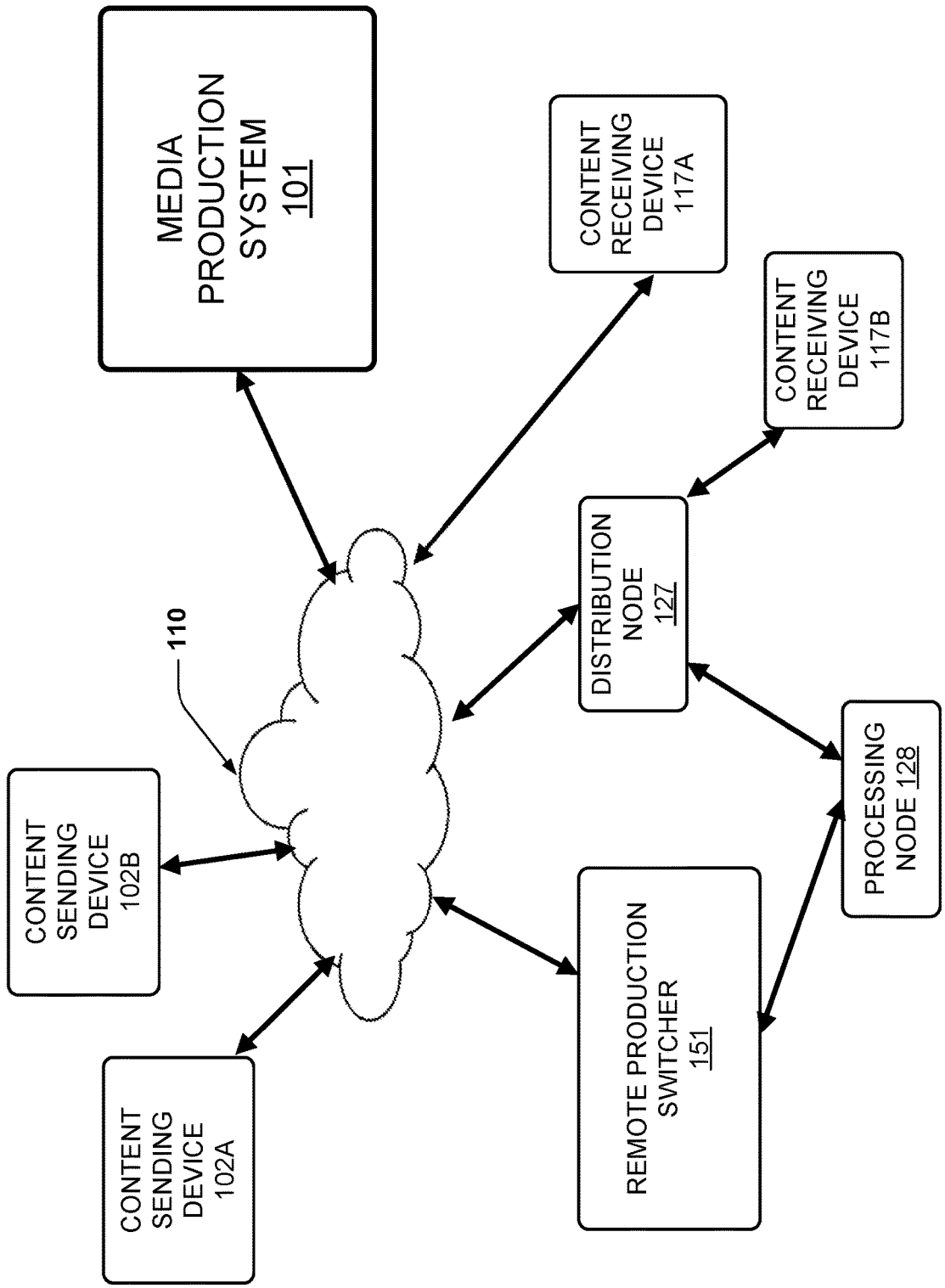
FIG. 1 illustrates a block diagram of a system for streaming content between peer devices in a broadcast environment according to an exemplary embodiment.

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

In general, certain aspects of the system and method for streaming content between peer devices in a broadcast environment will now be presented with reference to various systems and methods. These systems and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

FIG. 1 illustrates a block diagram of a system for streaming content between peer devices in a broadcast environment according to an exemplary embodiment. As will be described in detail below, the exemplary system 100 includes a streaming notification service controller that is configured to coordinate streaming of broadcast quality content for one or more media content streams and over a peer to peer connection in a production and broadcast environment. In the exemplary aspect, the peer devices can be configured to communicate (i.e., send and/or receive) media content using the WebRTC (Web real-time communication) protocols to enable the web browsers or other media broadcast applications executing thereon for data communication using configurable APIs. By doing so, the peer devices do not need to install plugins or download native applications before sending, and more particularly, receiving the broadcast media content. Instead, the content streams can bypass the firewalls (e.g., of the receiving devices) using the established channels to receive the broadcast content.

In general, media content provided for transmission and/or broadcast production according to system 100 can generally be referred to as "essence", which denotes media that can be consumed by a user/client device (e.g., a video clip, an audio clip, and/or ancillary data, such as captions). As shown, the system 100 includes a media production system 101, which can include the streaming notification service controller discussed in more detail below with respect to FIG. 2. The media production system 101 can be configured as a software based environment that can be provided in a cloud-computing environment, remote production center, production truck or the like, as would be appreciated to one skilled in the art. More particularly, the media production system 101 can be configured as a virtual router panel in a cloud computing environment. It is also noted that the exemplary embodiment is described in the context of media production and specifically live or real-time media production and broadcast. Thus, the media production system 101 is configured to dynamically control media broadcast from one or more first peer devices to one or more second peer devices in a low latency environment over multiple networks.

As shown, FIG. 1 illustrates a block diagram 100 that is specific to a live media production environment. In general, the media production system 101 is configured to facilitate streamlined and efficient media production in a broadcast environment. Thus, the media production system 101 can generally be located remotely from all of the other components in the system and, in some embodiments, coupled to the components (which can be part of a cloud computing environment) to effectively control the system.

System 100 includes a plurality of content sending devices 102A and 102B. In an exemplary aspect, the plurality of content sending devices 102A and 102B can be configured to generate and/or send media streams across links via the network 110. Moreover, it is noted that while only two devices are shown, the system 100 can be implemented using any number of content generating devices. The plurality of content sending devices 102A and 102B can also include, for example, remote camera's configured to capture live media content, such as the "talent" (e.g., news broadcasters, game commentators, or the like). In the exemplary aspepct, the content sending devices 102A and 102B can be client computing devices configured to provide, for example, Esports (electronic sports) real-time content, or similar broadcast quality content. Yet further, while an exemplary aspect implements the content sending devices 102A and 102B that are located at a live event, a similar configuration can be used for a remote video server, a client device, or the like, for example, that is configured to store media content and distribute this content as a broadcasted media stream(s) through the media distribution network.

As further shown, the plurality of content sending devices 102A and 102B can be coupled to a communication network, such as the Internet 110, and/or hardware conducive to internet protocol (IP). That is, system 100 can be comprised of a network of servers and network devices configured to transmit and receive video and audio signals of various formats. As noted above, in one aspect, the processing components of system 100 can be executed in part of a cloud computing environment, which can be coupled to network 110. Moreover, the media production system 101 can be configured to access and dynamically coordinate the broadcasting of the video and audio signals and/or media streams generated or transmitted by the content generating devices 102A and 102B, or information related to the various signals and content presented therein, as will be described in detail below.

In general, cloud computing environments or cloud platforms are a virtualization and central management of data center resources as software-defined pools. Cloud computing provides the ability to apply abstracted compute, storage, and network resources to the work packages provided on a number of hardware nodes that are clustered together forming the cloud. Moreover, the plurality of nodes each have their specialization, e.g., for running client micro-services, storage, and backup. A management software layer for the application platform offered by the cloud will typically be provided on a hardware node and will include a virtual environment manager component that starts the virtual environments for the platform and can include micro-services and containers, for example. Thus, according to an exemplary aspect, one or more of the components (or work packages) of system 100 that can be implemented in the cloud platform as described herein.

As yet further shown, system 100 can include one or more remote distribution node(s) 127, one or more processing node(s) 128, and one or more remote production switcher(s) 151. These components can be implemented as hardware components at various geographical locations or, in the alternative, as processing components as part of a cloud computing environment. The one or more distribution nodes 127 (e.g., electronic devices) are configured to distribute and/or relay the media streams (e.g., as relay servers, such as a TURN server discussed below) coordinated by the media production system 101 to one or more distribution nodes (e.g., remote media devices), such as content receiving devices 117A and 117B, which can be content consuming devices (e.g., televisions, computing devices, or the like), for example. As shown, the content receiving devices (e.g., content receiving device 117A) can be coupled directly to network 110 or to a distribution node or server 127, for example. As described herein, the content sending devices 10A and 102B can be first peer devices and the content receiving devices 117A and 117B can be second peer device, which stream media content from one to another over the Internet environment (e.g., over network 110). In an exemplary aspect, the content receiving devices 117A and 117B can be client devices configured with video editing software for editing the received content from the content sending devices 10A and 102B as part of a video media production workflow, for example.

It should also be appreciated that while only two content receiving devices 117A and 117B are shown, the network can include any number of content consuming devices configured to receive and consume (e.g., playout) the broadcasted media content, with such content consuming devices even being distributed across different countries or even different continents. As a result, the system 100 can be configured as a media network for real-time production and broadcasting of video and audio content.

Yet further, system 100 can include additional components that are typically included a video production system that are well known to those skilled in the art and are not shown in FIG. 1. More particularly, system 100 can include one or more codecs configured to encode in the media signals at a particular compression format for the transmission to satisfy the media request parameters. In general, such codecs are configured to perform encoding of video and audio data (as well as ancillary data) into data packets for transmission over IP in the media distribution network. In a specific exemplary aspect, the content sending devices 102A and 102B can include encoders for encoding the media packets, while content receiving devices 117A and 117B can include decoders for decoding the encoded media content.

Moreover, in some examples, codecs may encode video and audio data into non-compressed (e.g., linear pulse code modulation, pulse-density modulation, direct stream digital pulse-amplitude modulation, etc.), lossless (e.g., free lossless audio codec, optimFROG, wavepak, true audio, etc.), and lossy (e.g., adaptive differential (or delta) pulse-code modulation, adaptive transform acoustic coding, MPEG-1, MPEG-2, MPEG-3, MPEG-4, etc.).

According to an exemplary aspect of this network, distribution node(s) 127 can further be configured to distribute the media content throughout the distribution network to one or more processing node(s) 118, which may include a mix/effects engine, keyer or the like. In addition, remote distribution node(s) 127 can be configured to feed remote processing node(s) 128 via a direct link, or via Internet 103 connection. Examples of remote distribution node(s) 127 and processing node(s) 128 may include remote production switches similar to remote production switcher 151 or remote signal processors.

According to an exemplary aspect, the media production system 101 is configured to coordinate and dynamically control the sending of broadcast quality media streams between peer devices in a broadcast network. As described above an in a first example, the content sending devices 102A and 102B can be considered media distribution devices and content receiving devices 117A and 117B can be considered content consuming devices. Thus, as an example described herein, the media production system 101 coordinates media streaming from one or more content sending devices 102A and 102B to one or more content receiving devices 117A and 117B for media consumption while minimizing latency of the streaming. It should also be appreciate that any of the nodes shown in FIG. 1 can be considered a media distribution device, including for example, the distribution node(s) 127. In that instance, the media production system 101 may configure the distribution node 127 and content receiving device 117B as the peer devices that implement the methods and processes described herein for streaming media content. In general, the logic and processing described herein for performing the handshaking to establish connections, for example, will be implemented at each endpoint (e.g., each peer device) in the network for performing the media streaming.

Figure 2:
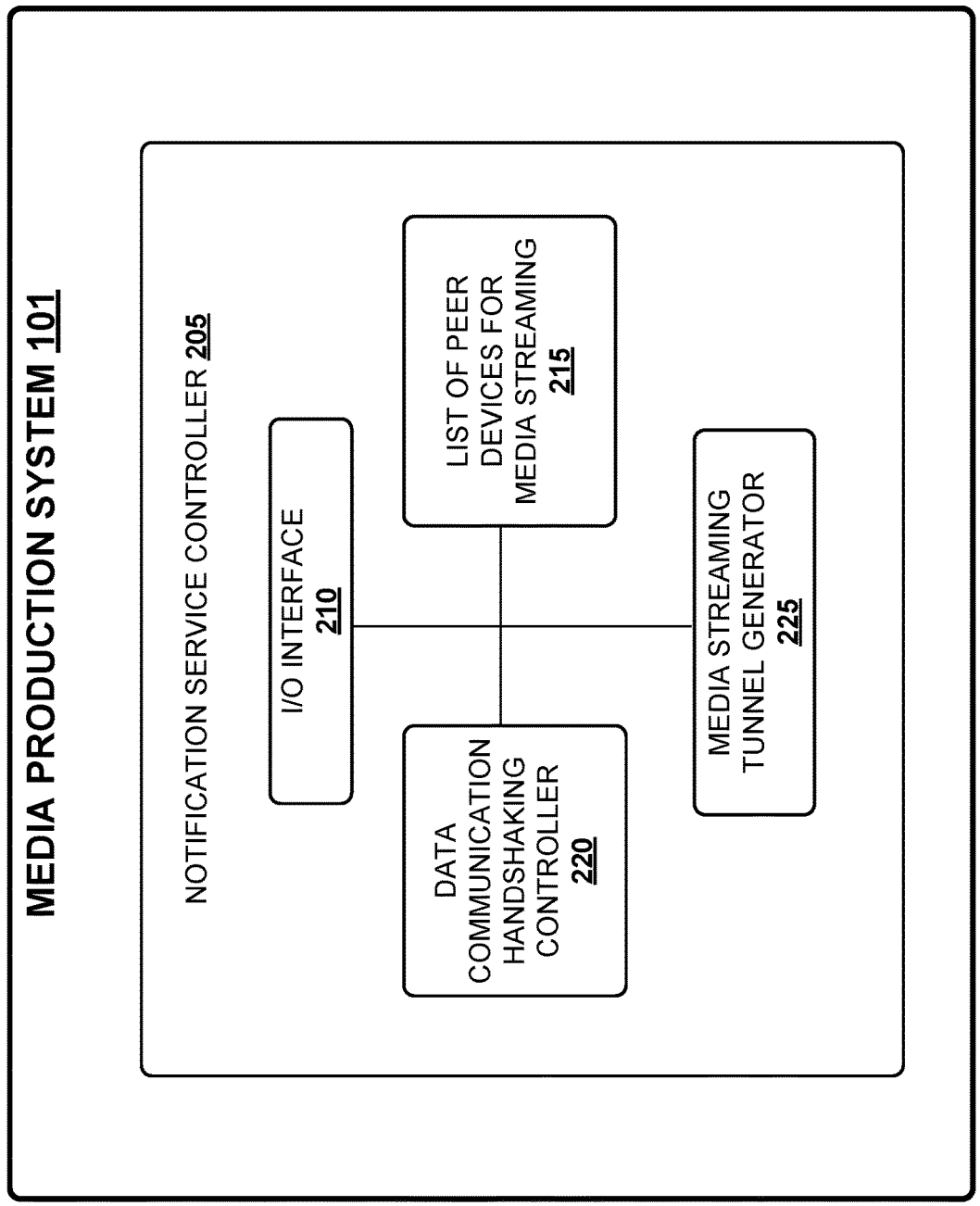
FIG. 2 illustrates a block diagram of the media production system for streaming content between peer devices in a broadcast environment according to an exemplary embodiment.

FIG. 2 illustrates a block diagram of the media production system 101 for controlling the streaming of media content between peer devices in a broadcast environment. In the exemplary aspect, the media production system 101 includes notification service controller 205 that is configured to coordinate and control the peer to peer device streaming described herein. For example, the media production system 101 can be implemented as a virtual video switcher configured to implement notification service controller 205 to coordinate the media streaming described herein. In alternative aspects, notification service controller 205 can be provided as a standalone component within system 100 described above, or even implemented on another node shown within the system as would be appreciated according to those of skill in the art.

In general, the notification service controller 205 can be implemented as software engines or modules configured for executing the algorithms disclosed herein, for example. The term "module" refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

According to the exemplary aspect, the notification service controller 205 is configured to establish Internet wide peer to peer streaming without prior configuration of firewalls on the peer devices. More particularly, the notification service controller 205 includes an I/O interface 210 configured to receive data communication requests for the various peer devices in the network. For example, the data communication requests can be media broadcast offers (e.g., a media publication request) from a content sending device 102A, for example, and content consumption requests (e.g., a media subscription request) from a content receiving device 117A, for example. Each of these requests and the associated devices can be stored on a list of peer devices for the media streaming 215, which can be used by the notification service controller 205 to dynamically control and update the streaming of media content.

Next, a data communication handshaking controller 220 is configured to establish connections between peer to peer devices for the broadcast streaming. To do so, the data communication handshaking controller 220 is configured to exchange a plurality of candidates between the peers set forth in list 215. In the exemplary aspect, the signaling step is performed out-of-band in which each peer devices tries to connect directly to the requesting remote device (e.g., by offer and response messaging) using the candidates until it identifies a successful connection. More specifically, the data communication handshaking controller 220 will try to identify local IP addresses of each peer and if they are identifiable, media streaming tunnel generator 225 will establish a direct connection to stream the media content from the sending device to the receiving device.

Figure 3A:
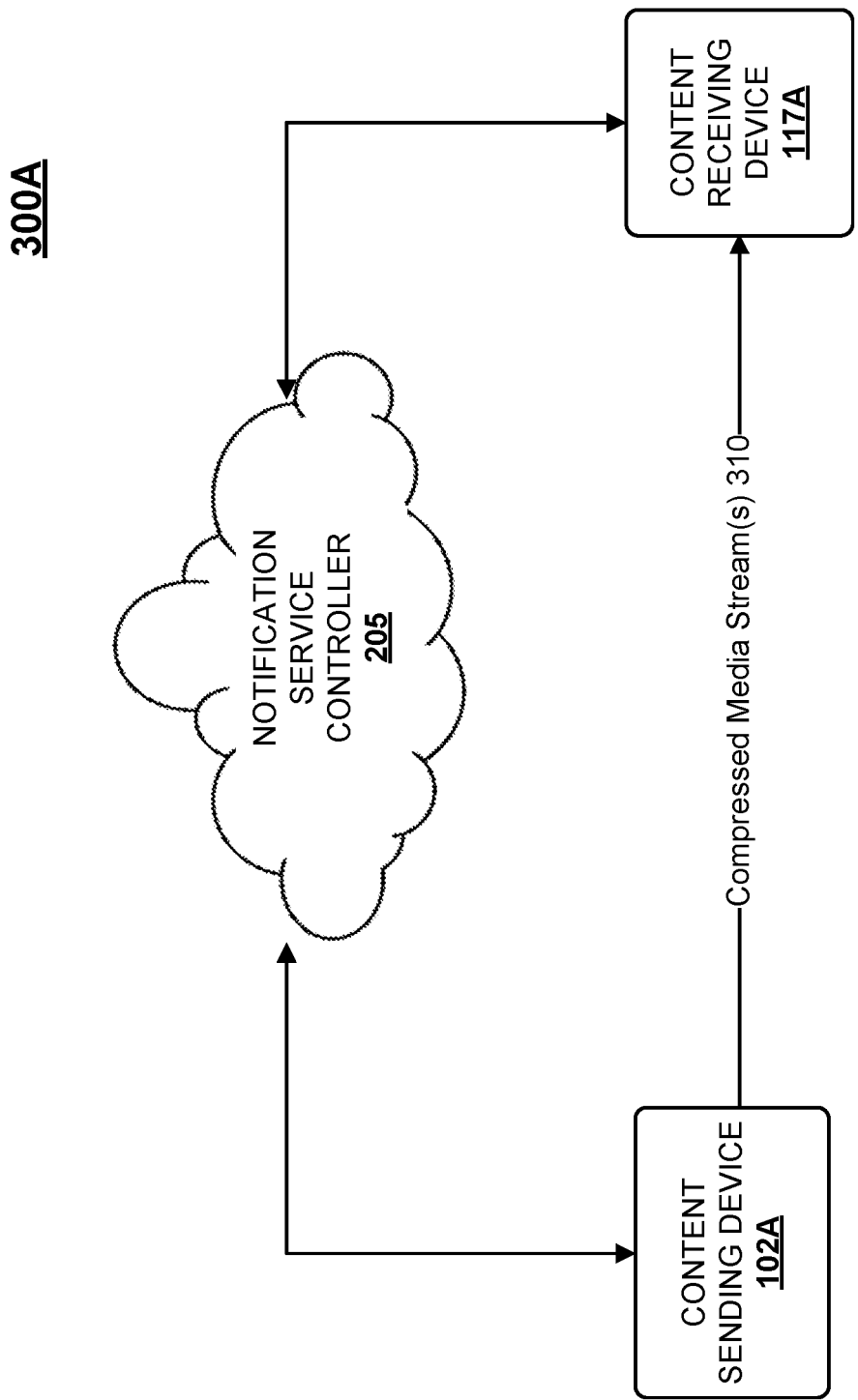

FIG. 3A illustrates a first process for establishing connections between peer devices in a broadcast environment according to an exemplary embodiment. As described above, each of content sending device 102A and content receiving device 117A are "peer" devices configured to transmit and/or receive media content using WebRTC protocols. In operation, each peer device is configured to generate a media communication request (e.g., a publication or subscription request) for media content, and, specifically, to transmit these requests to media production system 101, for example, to be logged in list 215.

In turn, notification service controller 205 is configured to perform the handshaking protocols described herein to establish a connection between the peer devices for purposes of the media stream. That is, the communication handshaking controller 220 exchanges candidates between the peers. If each unique IP addresses is identifiable for both requesting peer devices, the notification service controller 205 is configured to establish a media streaming content between the devices. More particularly, as shown in FIG. 2, the notification service controller 205 includes media streaming tunnel generator 225 that establishes a direct connection between the peer devices for the content sending device 102A to transmit compressed media stream(s) 310 to content receiving device 117A. As described above, by using this technique, any firewalls at the sender and receiver can be securely bypassed and there is no need to externally expose those associated IP addresses or ports for purposes of streaming broadcast content between the peer devices.

FIG. 3B illustrates a second process for establishing connections between peer devices in a broadcast environment according to an exemplary embodiment. In particular, the notification service controller 205 is configured to perform this second process if a direct connection cannot be established between peers as shown in FIG. 3A. That is, if local IP addresses of one or more of the requesting peer devices is not externally reachable by the other peer device, the notification service controller 205 can be configured to message a STUN server to detect the externally visible IP addresses and ports of the specific peer device.

In general, a STUN (session traversal of UDP through network address translators (NATs)) server runs on a public network and replies to incoming requests with responses that include the public IP address of the requesting device. Thus, as shown, each of the content sending device 102A and content receiving device 117A can be communicatively coupled to STUN server 320 and configured send a request to the STUN server to detect the IP address of the other peer device. The STUN server 320 sends a response request that becomes the server reflexive candidate for media streaming. Using the server reflexive candidate, the first peer device sends an offer message to second peer device, which can then obtain a server reflexive candidate. Since the first peer device (e.g., content sending device 102A) started the communication, it is deemed as controlling and the second peer device (content receiving device 117A) is controlled. After receiving the STUN binding request, the second peer device can perform a matching check using attributes from the first peer devices STUN binding request to verify the connection. At this point, both peers have verified that the connection is valid and it has been nominated for use for this media stream. As a result, content sending device 102A can now stream media content 310 directly through this connection to content receiving device 117A.

Figure 3C:
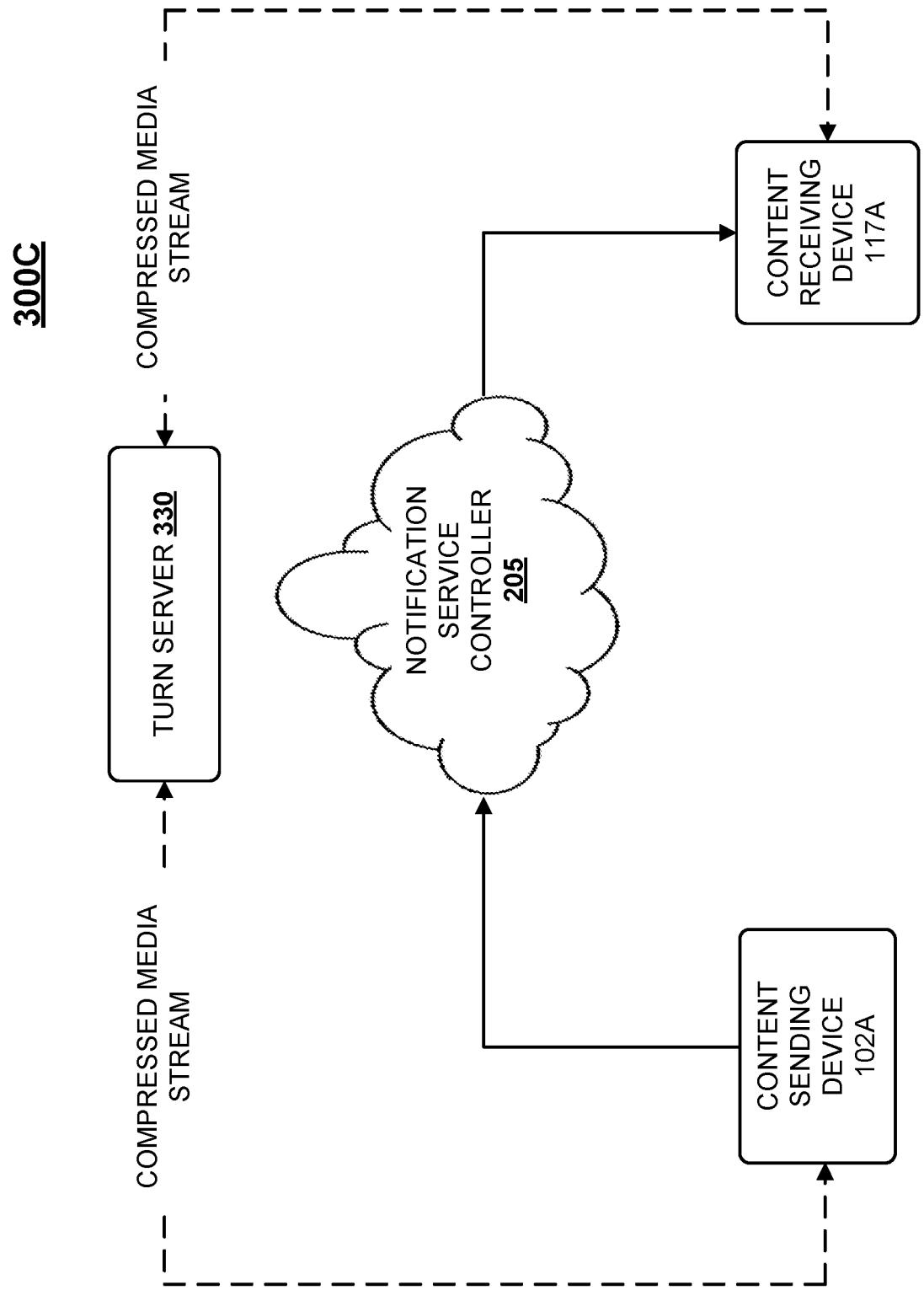

FIG. 3C illustrates a third process for establishing connections between peer devices in a broadcast environment according to an exemplary embodiment. In particular, the notification service controller 205 is configured to perform this third process if the STUN server cannot detect externally visible IP and ports of each peer. In this instance, both of the peers (e.g., the content sending device 102A and content receiving device 117A) will default to communicating the compress media stream(s) through TURN (traversal using relays around NAT) server 330. Turn server 330 is effectively a relay server that is configured to traverse network address translators (NATs) and/or firewalls for multimedia applications. Thus, while using a TURN server as shown in FIG. 3C (as opposed to a direct connection or STUN server) will increase latency, this configuration still enables the peer to peer media communication to circumvent firewalls. Moreover, in one aspect, the TURN or relay server is preferably positioned very close (e.g., within the same datacenter) to one of the peer devices to reduce the latency costs with the additional hop being negligible.

Figure 4:
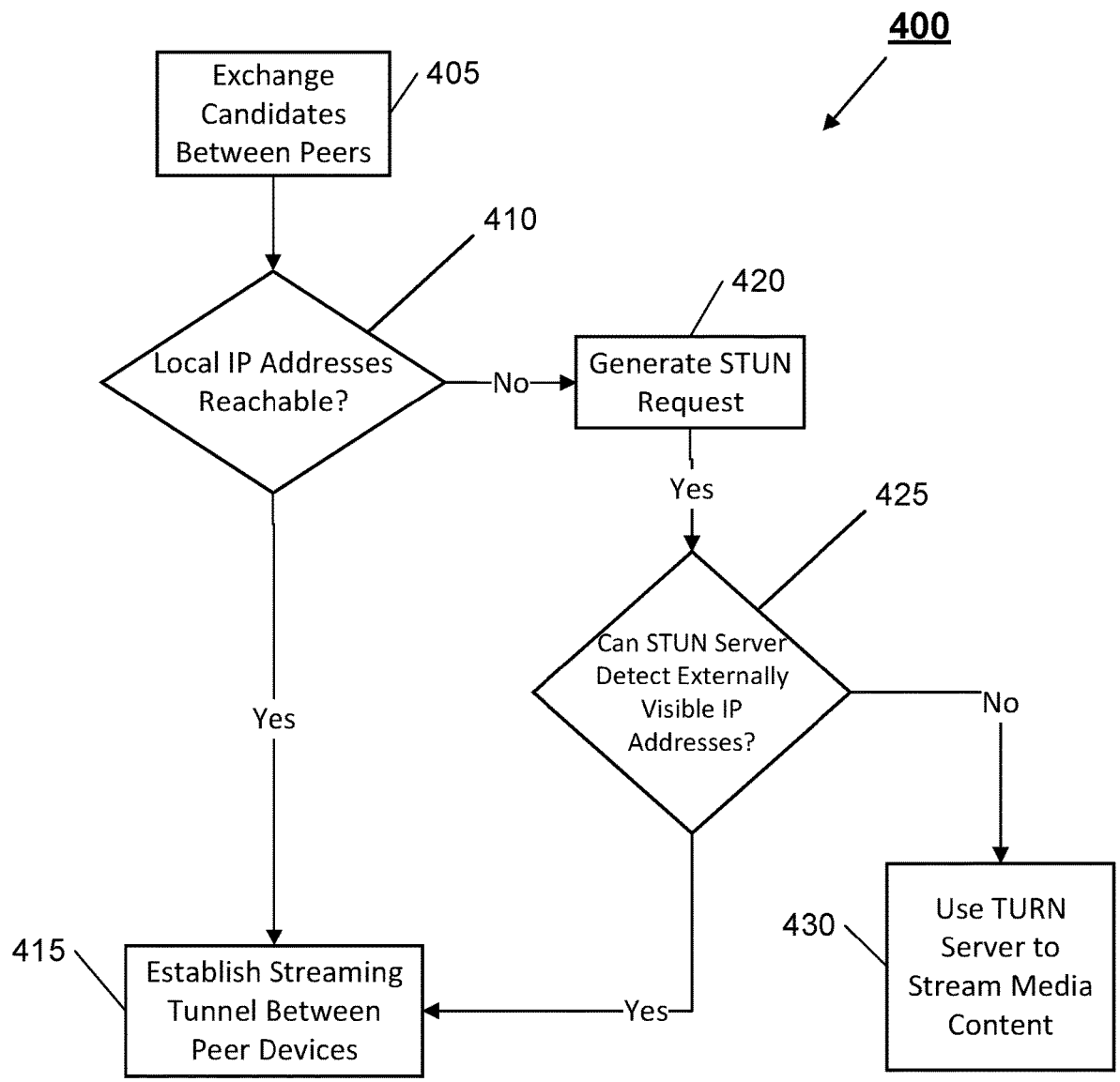
FIG. 4 illustrates a flowchart for a method for streaming content between peer devices in a broadcast environment according to an exemplary embodiment.

FIG. 4 illustrates a flowchart for a method 400 for streaming content between peer devices in a broadcast environment according to an exemplary embodiment. The method 400 can be implemented using the system 100 and notification service controller 205 as described above according to an exemplary aspect and also involves the processes show in FIGS. 3A-3C. Moreover, it should be appreciated that the notification service controller 205 is essentially implementing interactive connectivity establishment (ICE) protocols for purposes of establishing the connection between peer devices in the broadcast environment.

Initially, at step 405, the notification service controller 205 receives a plurality of media communication requests from peer devices in a media broadcast network. The media communication requests can include at least one request to publish (e.g., broadcast) media content to one or more content receiving devices (e.g., devices 117A and 117B). In one aspect, the one or more content receiving devices independently send request to the notification service controller 205 for available content and can specific the type of content, for example, by a user entering a media content request by a user interface on the respect device. Upon request the requests from the peer client devices, the notification service controller 205 is first configured to store a list 215 of requesting devices and then exchange candidates between pairs as described above.

At step 410, using the handshaking procedure described above, the notification service controller 205 is configured to determine if local IP addresses of each peer device (e.g., two or more client devices) are determinable/reachable. If so, the notification service controller 205, and, in particular, the media streaming tunnel generator 225, is configured to establish a streaming tunnel between the peer devices at step 415, e.g., content sending device 102A and content receiving device 117A. In this configuration, a direct connection is established between the devices for minimal latency of the streaming content. Once this streaming tunnel is established between two or more peer devices, the notification service controller 205 can instruct the respective content sending device to begin streaming the media content over this established streaming tunnel.

If, on the other hand, one of the local IP addresses is not reachable at step 410, the method proceeds to step 420 to generate a STUN request to the STUN server, which tries to detect the IP addresses and ports of the respective peer device. Specifically, at step 425, the STUN server attempts to detect externally visible IP address of the one more peer devices. If so, the method proceeds again to step 415 where the media content can subsequently be streamed between, for example, content sending device 102A and content receiving device 117A.

Finally, if the STUN server cannot detect one or more IP addresses for the requesting peer devices, the method will proceed to step 430 to use a TURN server for communicating the media content. As noted above, this process is generally considered an Interactive Connection Establishment (ICE) streaming protocol. However, by implementing in the current broadcasting environment as described herein, the media production system 101 is configured to facilitate and coordinate a broadcast streaming environment with minimal latency.

More specifically, the list of peer devices for media streaming 215 can be built and dynamically adjusted and updated by notification service controller 205. For example, in one aspect, a list of video content sending devices can be included in the list 215 along with data relating to the available content that has been published for consumption. Upon executing the processes and methods shown in FIGS. 3A-3C and 4, the notification service controller 205 can store metadata in the list 215 that identifies which type of connection was used for the specific source of content. Thus, when a subsequent peer device issues a media consumption request, which identifies content published by the content sending device, the notification service controller 205 is configured to dynamically access list 215 to select the best source of content to minimize latency, for example. For example, if multiple media sources have the same content and are cataloged in the list 215, the notification service controller 205 can be configured to select the content sending device with a reachable IP address to establish a direct connection with the one or more content requesting devices, using the process shown in FIG. 3A, for example.

According to the exemplary aspect, once the streaming tunnel and the format is generated for transmitting media content, the content sending device (e.g., device 102A) is configured to stream the media content (as a compressed video signal) to the content receiving device (e.g., device 117A). For example, the notification service controller 205 can be configured to transmit a confirmation to the peer devices indicating the configurations and parameters of the streaming tunnel. The content sending device 102A is then configured to transmit the media content based on raw codecs over RTP rather than using resource heavy multiplexing to synchronize timing as discussed above. As a result, the receiving device will not be required to extract packet identifiers to align each transport stream.

For example, each content sending device can include a media encoder configured to encode the media content using, for example, H.264 or H.265 encoding techniques for video content and Opus for encoding audio content. To maintain synchronization, each RTP packet can be constructed to carry a header extension containing an original timestamp based on PTP (precision timing protocol). When the packets are unpacked at the receiver, the original timestamps enable the receiver (e.g., content receiving device 117A) to make presentation and synchronization decisions. Moreover, ancillary data can be transmitted using SMPTE 2110-40, for example.

Figure 5:
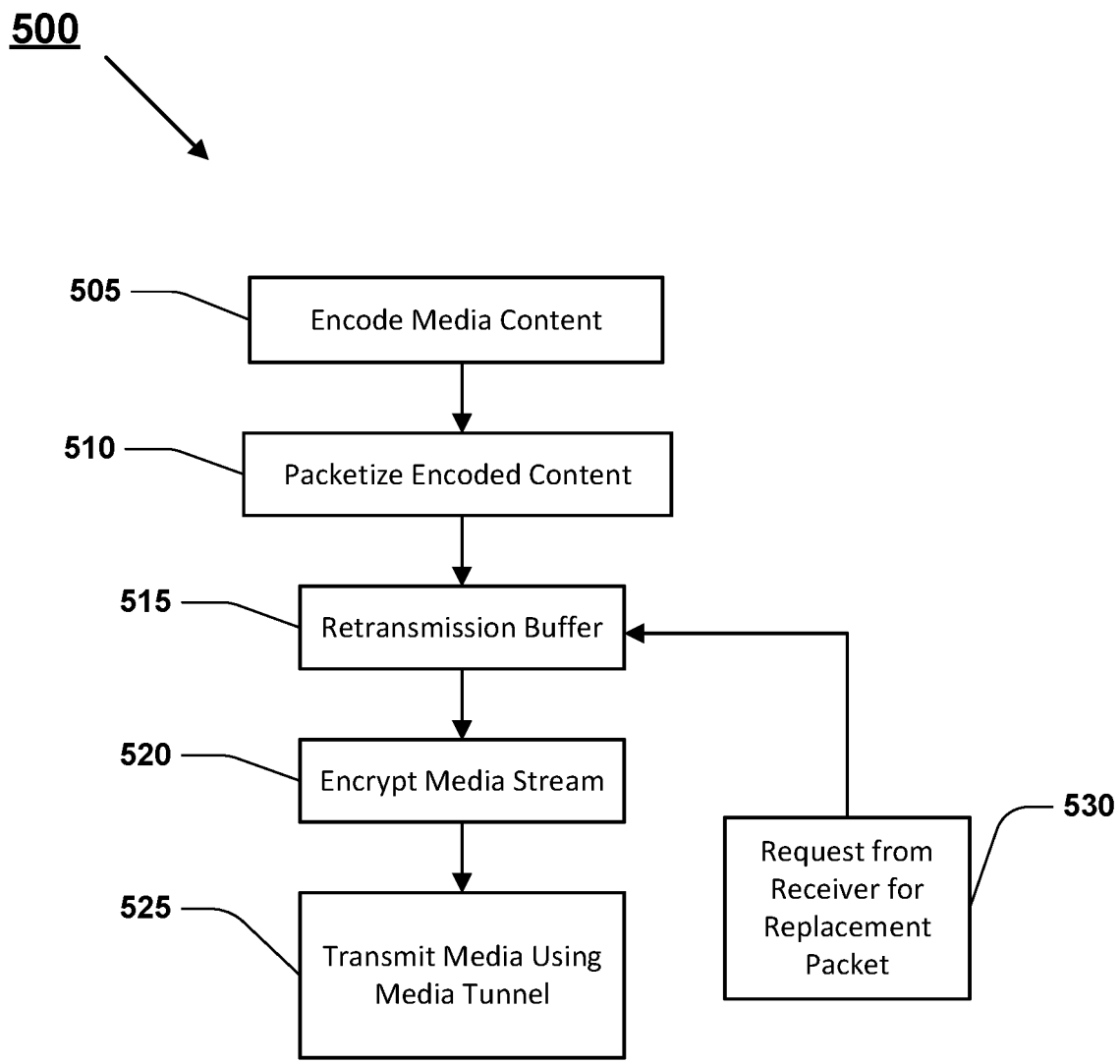
FIG. 5 illustrates a flowchart for a method for streaming content between peer devices in a broadcast environment according to an exemplary embodiment.

FIG. 5 illustrates a flowchart for a method for streaming content between peer devices in a broadcast environment according to an exemplary embodiment. In general, the method 500 shown in FIG. 5 can be implemented by any peer device configured to broadcast media content to a connected peer device using the algorithms and techniques described above. For example, in one aspect, method 500 can be executed by content sending device 102A and/or 102B as is configured to stream media content once a streaming tunnel is established.

Specifically, at step 505, the content sending device is first configured to encode the media content as raw data, for example, video content encoded using H.264 and H.265 standards and audio content using Opus. Next, at step 510, the encoded media content is packetized as RTP packets created, for example, at the application layer and including RTP packet headers. In an exemplary aspect, the RTP packet headers will include a 32-bit synchronization time stamp (i.e., a "RTP time stamp") and a 16 bit sequence number, which is essentially a datagram counter. The respective time stamps of the RTP datagrams provide true time positions for the receiver to synchronize the received content.

At step 515, the packetized and encoded content can be stored in a retransmission buffer of the content sending device before it is encrypted as a media stream(s) at step 520. In one aspect, connection establishment can be performed using secure (e.g., HTTPS) and authenticated communications. Once connection has been established, each packet is encrypted using DTLS/SRTP protocols, for example. Finally, at step 525, the content sending device (e.g., device 102A) is configured to stream (as the compressed media stream(s) 310) the media stream using the media tunnel, for example, a direct connection as shown in FIG. 3A, to the content receiving device.

According to an exemplary aspect, the peer to peer media transmission can use different protocols to protect content streams and provide replacement packets. For example, the system can optionally combine both FEC (i.e., FlexFec) and ARQ (e.g., RIST) depending on the conditions and available bandwidth. In particular, a short RIST retransmission buffer (e.g., at step 515) can be provided to correct most packet loss situations while keeping latency to a minimum. Thus, as shown, at step 530, a request can be received from the receiver for a replacement packet (e.g., in case of a lost packet) in which the packets are retransmitted to the receiving device. In another aspect, the transmitting device can use, for example, the SMPTE 2022-7 communication standard to duplicate the media broadcast streams that can be sent along two different paths (e.g., two separate direct connections) to the receiving device.

Figure 6:
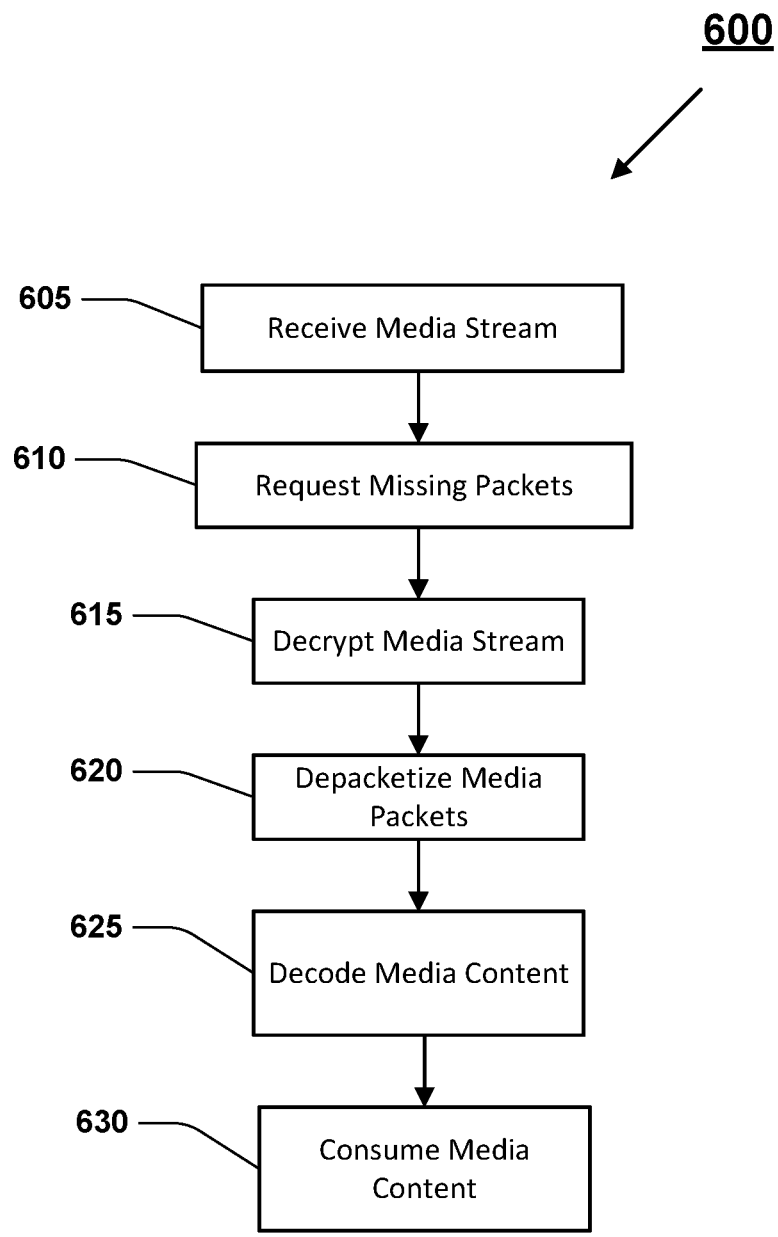
FIG. 6 illustrates a flowchart for a method for receiving and consuming streamed content between peer devices in a broadcast environment according to an exemplary embodiment.

FIG. 6 illustrates a flowchart for a method for receiving and consuming streamed content between peer devices in a broadcast environment according to an exemplary embodiment. In general, the method 600 can be performed by any content receiving device (e.g., content receiving devices 117A and/or 117B) that are requesting to receive and consume broadcasted media content.

As shown, the encoded and encrypted media streams are initially received at step 605. At step 610, the receiver determines if there are any missing packets using the techniques described above and transmits such a request for replacement packets to the content sending device. At step 615, the received content is decrypted and the depacketized at step 620. That is, the receiving peer device is configured to parse the RTP header information to determine the timestamps and sequence numbers to align the media content (e.g., video, audio and ancillary content). The media content is then decoded at step 625 using the same encoding protocols discussed above before the media content can be played out at step 630, for example, as video content on a display screen of the content receiving device or in an editing software application thereon, for example.

Using the systems and methods described herein, a media broadcast environment is provided to minimize latency of the media stream using multiple strategies. As described above, the system avoids using the multiplexing and demultiplexing schemes that are typically required for UDP streaming protocols rely that carries its own PCR clock reference and PTS related to the PCR. Instead, the content is transmitted as raw codecs over RTP, keeping the coding simple and efficient with minimal latency.

Moreover, the codecs are selected for the media content to also minimize latency. For example, Opus codec enables configurable packet sizes and, in an exemplary aspect, the content can be encoded at 10 ms packets, which is less than a video frame duration and compromises between encoding efficiency and latency. Moreover, Opus provides the ability to carry its own FECs, i.e., packet n+1 carries its encoded grain and the FEC for packet n. If the receiver detects that the packet n is missing, then it can reconstruct it using he date in packet n+1, for example.

Yet further, existing video codecs rely on bidirectional predicted frames/slices (e.g., b-frames/slices). B-frames increase compression efficiency, but come at a latency cost by introducing image reordering. Frames are sent out of order and a receiver must reorder the frames as they arrive, which reordering process adds latency. The sender may also need to have a wider temporal view of the video frames to be encoded in order to perform efficient encoding. Thus, in an exemplary aspect, the content sending devices can be configured to use I frames and P frames if bandwidth permits to further reduce latency.

Figure 7:
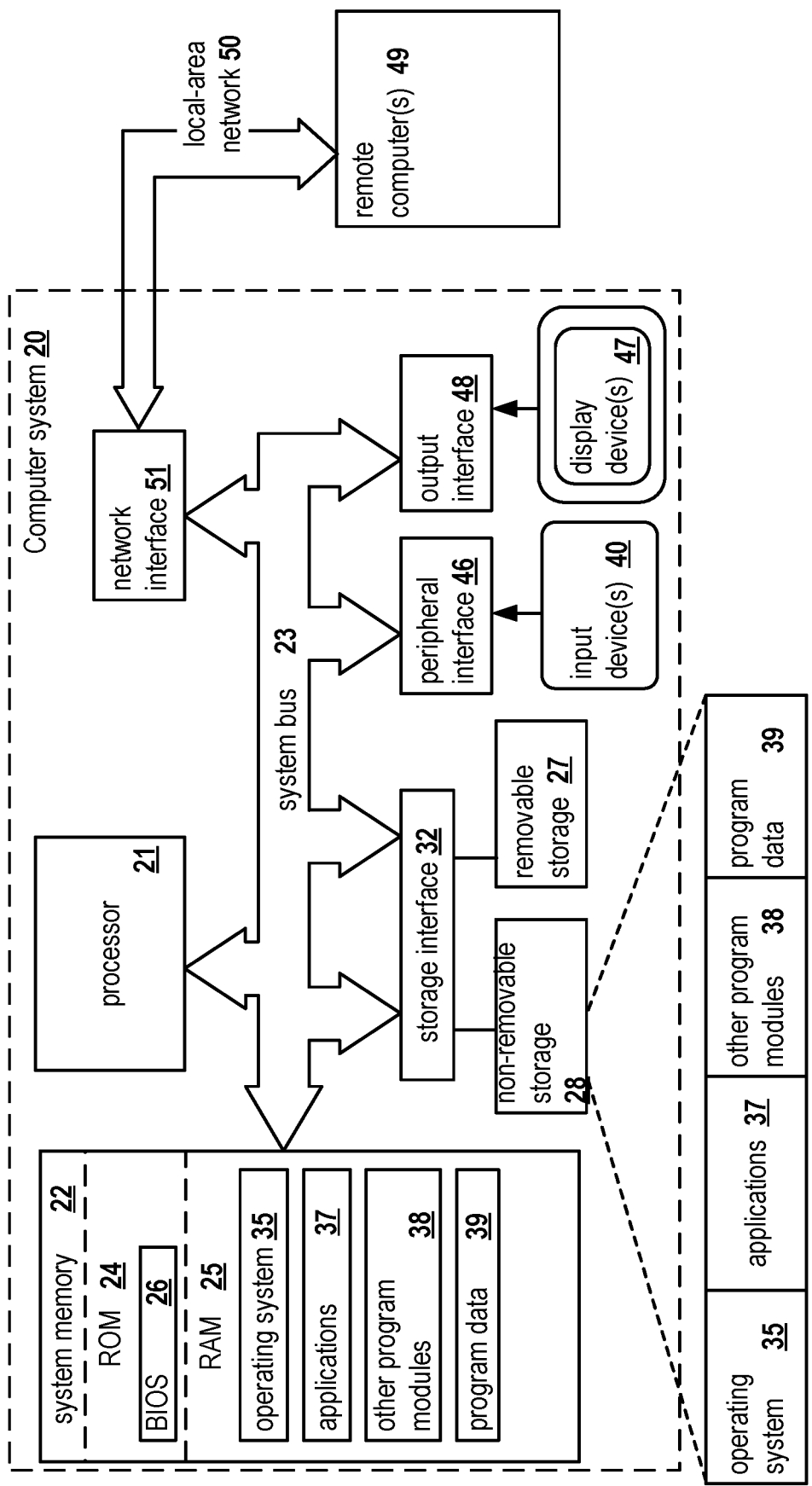
FIG. 7 is a block diagram illustrating a computer system on which aspects of systems and methods for streaming content between peer devices in a broadcast environment according to an exemplary embodiment.

FIG. 7 is a block diagram illustrating a computer system on which aspects of systems and methods for streaming media content between peer devices in a broadcast environment according to an exemplary embodiment. It should be noted that the computer system 20 can correspond to any computing system configured to execute the peer to peer streaming, including the media content sending devices 102A and 102B, the content receiving devices 117A and 117B and the media production system 101, for example. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD- ROM) or digital versatile disks (DVDs); and any other medium which may be used to store the desired data and which can be accessed by the computer system 20. It should be appreciated that in one exemplary aspect, the one or more removable storage devices 27 can correspond to scene script database 225, for example.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter, and can be configured to generate user interface 205, for example. In addition to the display devices 47, the computer system 20 may be equipped with other peripheral output devices (not shown), such as loudspeakers and other audio-visual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the remote processing nodes or client devices (e.g., the peer devices) as described above with respect to FIG. 1 as well as generally to a cloud computing platform for configuring the media production system.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. As described above, a module can refer to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIGS. 1 and 2, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for streaming broadcast media content between a plurality of peer devices in a media distribution network, the system comprising:
    a virtual router panel that includes notification service controller configured to receive a data communication request from at least two devices of the plurality of peer devices, wherein the data communication request from a first device of the at least two devices includes a publication request to provide the media content, and wherein the data communication request from a second device of the at least two devices includes a subscription request to receive the media content;
    a data communication handshaking controller configured to select a delivery protocol between the at least two devices based on exchanging communication candidates that identify peer addresses configurable for performing media streaming of the media content from the first device to the second device, wherein the data communication handshaking controller:
      selects a first delivery protocol when the communication candidates identifies local IP addresses of the first and second devices,
      selects a second delivery protocol that identifies a STUN server if at least one of the communication candidates is an externally visible IP address, and
      selects a third delivery protocol that utilizes a relay server for streaming the media content having a publicly visible address;
    a media streaming tunnel generator configured to establish a streaming tunnel between the first device and the second device based on the respective delivery protocol selected by the data communication handshaking controller; and
    an encoder configured to packetize video, audio and ancillary grains directly as a plurality of packets of the broadcast media content configured to be streamed directly from the first device to the second device via the established streaming tunnel without multiplexing, wherein the established streaming tunnel is configured to bypass a firewall on the second device to deliver the plurality of packets of the broadcast media content thereon, and wherein the plurality of packets include real-time transport protocol (RTP) timestamps that are unpacked by the second device to align and synchronize the media content during playout thereon.

2. The system according to claim 1, wherein the media streaming tunnel generator establishes the streaming tunnel for Internet streaming of the broadcast media content from the first device to the second device without prior configuration of the firewall on the second device.

3. The system according to claim 2, wherein the established streaming tunnel streams the broadcast media content from the first device to the second device without exposing an IP address and a port of the second device.

4. The system according to claim 1, wherein the at least two devices of the plurality of peer devices communicate the respective data communication requests based on respective web browsers using Web real-time communication protocols to communicate the requests to the virtual router panel.

5. The system according to claim 1, wherein the notification service controller is configured to store a list of the plurality of peer devices that includes metadata indicating a respective type and format of the streaming tunnel that streams the broadcast media content from the first device to the second device, such that a subsequent subscription request from another of the plurality of peer devices can access the broadcast media content over a streaming tunnel based on the stored type and format available by the first device.

6. The system according to claim 1, wherein the encoder packetize the video, audio and ancillary grains based on raw codecs over RTP, such that the first device streams the broadcast media content over the streaming channel to the second device without the multiplexing to synchronize timing of the video, audio and ancillary grains.

7. A system for streaming broadcast media content between a plurality of peer devices in a media distribution network, the system comprising:

a media production system that includes notification service controller configured to receive a data communication request from at least two devices of the plurality of peer devices, wherein the data communication request from a first device of the at least two devices includes a publication request to provide the media content, and wherein the data communication request from a second device of the at least two devices includes a subscription request to receive the media content;

a data communication handshaking controller configured to select a delivery protocol between the at least two devices based on exchanging communication candidates that identify peer addresses configurable for performing media streaming of the media content from the first device to the second device, wherein the data communication handshaking controller:

selects a first delivery protocol when the communication candidates identifies local IP addresses of the first and second devices, selects a second delivery protocol that identifies a STUN server if at least one of the communication candidates is an externally visible IP address, and selects a third delivery protocol that utilizes a relay server for streaming the media content having a publicly visible address;

a media streaming tunnel generator configured to establish a streaming tunnel between the first device and the second device based on the respective delivery protocol selected by the data communication handshaking controller; and an encoder configured to packetize video, audio and ancillary grains directly as a plurality of packets of the broadcast media content configured to be streamed directly from the first device to the second device via the established streaming tunnel without multiplexing, wherein the established streaming tunnel is configured to bypass a firewall on the second device to deliver the plurality of packets of the broadcast media content thereon.

8. The system according to claim 7, wherein the plurality of packets include real-time transport protocol (RTP) timestamps that are unpacked by the second device to align and synchronize the media content during playout thereon.

9. The system according to claim 7, wherein the media production system is virtual router panel executed in a cloud computing environment for controlling the media streaming of the broadcast media content between the first device and the second device.

10. The system according to claim 7, wherein the media streaming tunnel generator establishes the streaming tunnel for Internet streaming of the broadcast media content from the first device to the second device without prior configuration of the firewall on the second device.

11. The system according to claim 10, wherein the established streaming tunnel streams the broadcast media content from the first device to the second device without exposing an IP address and a port of the second device.

12. The system according to claim 7, wherein the at least two devices of the plurality of peer devices communicate the respective data communication requests based on respective web browsers using Web real-time communication protocols to communicate the requests to the virtual router panel.

13. The system according to claim 7, wherein the notification service controller is configured to store a list of the plurality of peer devices that includes metadata indicating a respective type and format of the streaming tunnel that streams the broadcast media content from the first device to the second device, such that a subsequent subscription request from another of the plurality of peer devices can access the broadcast media content over a streaming tunnel based on the stored type and format available by the first device.

14. The system according to claim 7, wherein the encoder packetize the video, audio and ancillary grains based on raw codecs over RTP, such that the first device streams the broadcast media content over the streaming channel to the second device without the multiplexing to synchronize timing of the video, audio and ancillary grains.

15. A system for streaming broadcast media content between a plurality of peer devices in a media distribution network, the system comprising:

a media production system that includes notification service controller configured to receive a data communication request from at least two devices of the plurality of peer devices, wherein the data communication request from a first device of the at least two devices includes a publication request to provide the media content, and wherein the data communication request from a second device of the at least two devices includes a subscription request to receive the media content;

a data communication handshaking controller configured to select a delivery protocol between the at least two devices based on exchanging communication candidates that identify peer addresses configurable for performing media streaming of the media content from the first device to the second device;

a media streaming tunnel generator configured to establish a streaming tunnel between the first device and the second device based on the delivery protocol selected by the data communication handshaking controller; and an encoder configured to packetize video, audio and ancillary grains directly as a plurality of packets of the broadcast media content configured to be streamed directly from the first device to the second device via the established streaming tunnel without multiplexing, wherein the established streaming tunnel is configured to bypass a firewall on the second device to deliver the plurality of packets of the broadcast media content thereon.

16. The system according to claim 15, wherein the data communication handshaking controller is configured to:

select a first delivery protocol when the communication candidates identifies local IP addresses of the first and second devices, select a second delivery protocol that identifies a STUN server if at least one of the communication candidates is an externally visible IP address, and select a third delivery protocol that utilizes a relay server for streaming the media content having a publicly visible address.

17. The system according to claim 15, wherein the plurality of packets include real-time transport protocol (RTP) timestamps that are unpacked by the second device to align and synchronize the media content during playout thereon.

18. The system according to claim 15, wherein the media production system is virtual router panel executed in a cloud computing environment for controlling the media streaming of the broadcast media content between the first device and the second device.

19. The system according to claim 15, wherein the media streaming tunnel generator establishes the streaming tunnel for Internet streaming of the broadcast media content from the first device to the second device without prior configuration of the firewall on the second device.

20. The system according to claim 19, wherein the established streaming tunnel streams the broadcast media content from the first device to the second device without exposing an IP address and a port of the second device.

21. The system according to claim 15, wherein the at least two devices of the plurality of peer devices communicate the respective data communication requests based on respective web browsers using Web real-time communication protocols to communicate the requests to the virtual router panel.

22. The system according to claim 15, wherein the notification service controller is configured to store a list of the plurality of peer devices that includes metadata indicating a respective type and format of the streaming tunnel that streams the broadcast media content from the first device to the second device, such that a subsequent subscription request from another of the plurality of peer devices can access the broadcast media content over a streaming tunnel based on the stored type and format available by the first device.

23. The system according to claim 15, wherein the encoder packetize the video, audio and ancillary grains based on raw codecs over RTP, such that the first device streams the broadcast media content over the streaming channel to the second device without the multiplexing to synchronize timing of the video, audio and ancillary grains.

* * * * *